S. DE PROCOUDINE-GORSKY.
PHOTOGRAPHIC CAMERA FOR TAKING UP PART NEGATIVES FOR NATURALLY COLORED PICTURES.
APPLICATION FILED SEPT. 20, 1919.

1,375,175.

Patented Apr. 19, 1921.

7 SHEETS—SHEET 1.

Inventor:
Serge de Procoudine-Gorsky
By Lawrence Langner
Attorney

S. DE PROCOUDINE-GORSKY.
PHOTOGRAPHIC CAMERA FOR TAKING UP PART NEGATIVES FOR NATURALLY COLORED PICTURES.
APPLICATION FILED SEPT. 20, 1919.

1,375,175.

Patented Apr. 19, 1921.

7 SHEETS—SHEET 5.

Inventor:
Serge de Procoudine-Gorsky
By Lawrence Langner
Attorney.

S. DE PROCOUDINE-GORSKY.
PHOTOGRAPHIC CAMERA FOR TAKING UP PART NEGATIVES FOR NATURALLY COLORED PICTURES.
APPLICATION FILED SEPT. 20, 1919.

1,375,175.

Patented Apr. 19, 1921.

7 SHEETS—SHEET 7.

Inventor:
Serge de Procoudine-Gorsky
By Lawrence Langner
Attorney.

UNITED STATES PATENT OFFICE.

SERGE DE PROCOUDINE-GORSKY, OF GRANSTAD, KONNERUD, NEAR DRAMMEN, NORWAY.

PHOTOGRAPHIC CAMERA FOR TAKING UP PART NEGATIVES FOR NATURALLY COLORED PICTURES.

1,375,175.  Specification of Letters Patent.  Patented Apr. 19, 1921.

Application filed September 20, 1919. Serial No. 325,264.

*To all whom it may concern:*

Be it known that I, SERGE DE PROCOUDINE-GORSKY, a Russian subject, residing at present at Granstad, Konnerud, near Drammen, Norway, have invented certain new and useful Improvements in Photographic Cameras for Taking up Part Negatives for Naturally Colored Pictures; and I do hereby declare the following to be a full, clear, and exact description of the invention, such as will enable others skilled in the art to which it appertains to make and use the same, reference being had to the accompanying drawings, which form a part of this specification.

Part-negatives which are taken through special light-filters for the purpose of producing a colored positive picture (for instance, the three part-negatives for a colored total picture according to the three-color system) must be taken through the same object-glass or as quickly after each other as possible in order that the single pictures fit well together or coincide exactly. This invention relates to an apparatus, in which every single exposure of part-negatives for one and the same positive total-picture (for instance, the three part-pictures as for the three-color system) takes place through one and the same objective, the exposures occurring rapidly one after another on a film-ribbon, and in which the operating speed may be regulated within wide limits, for instance, by regulating the elasticity of a spring.

Figure 1:
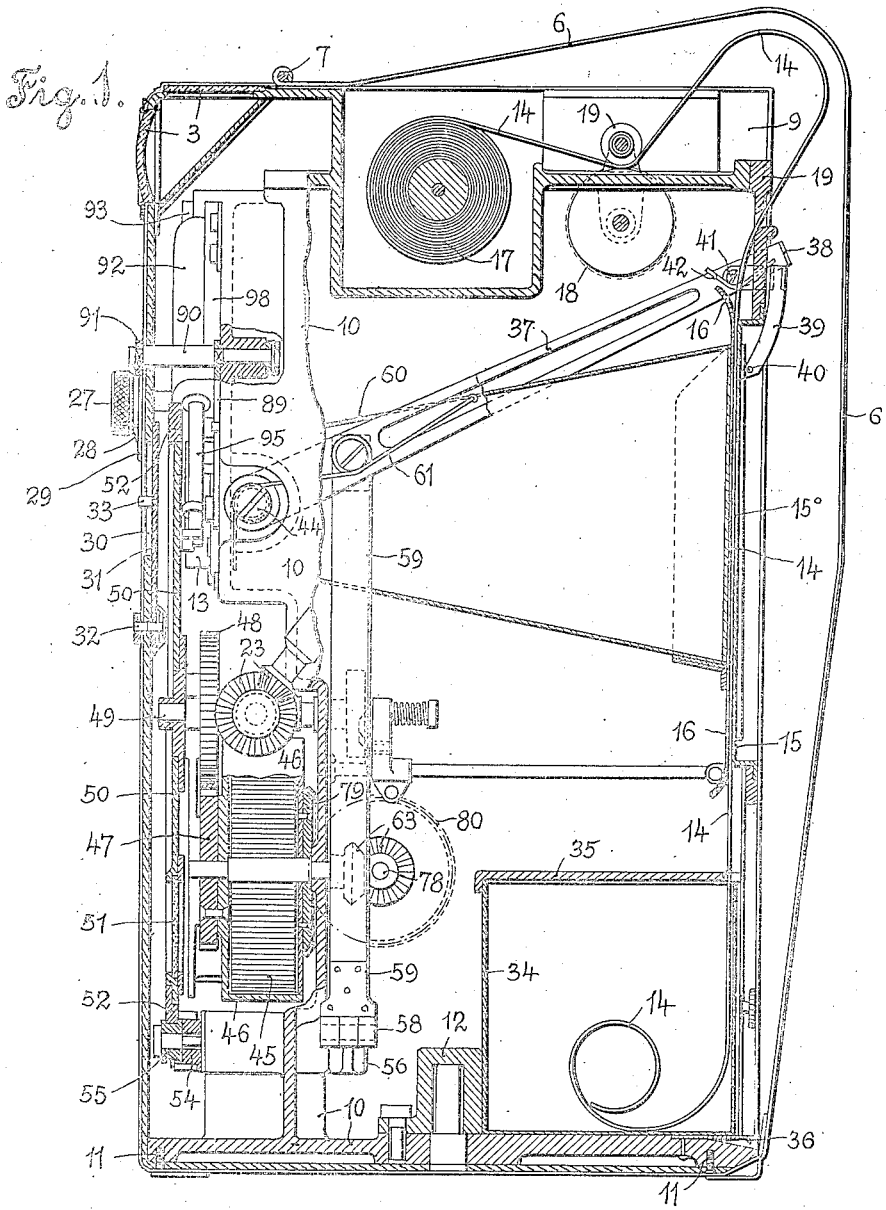
Figure 2:
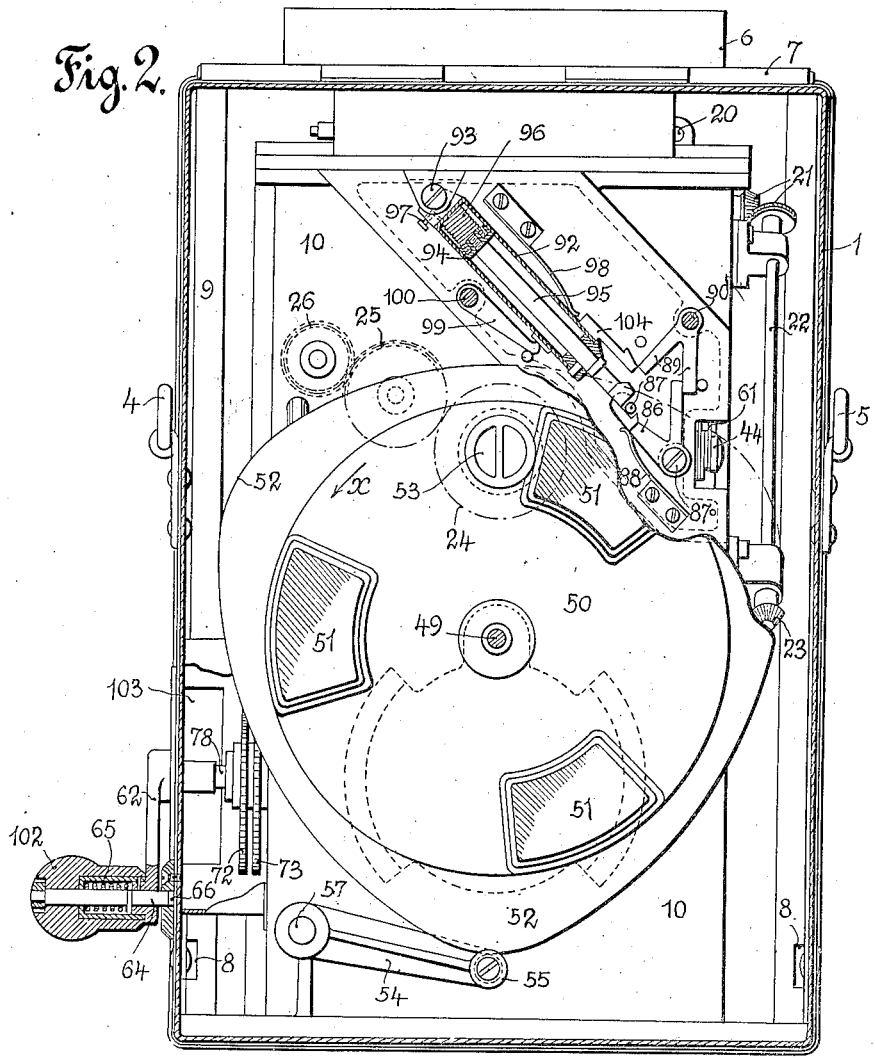
Figure 3:
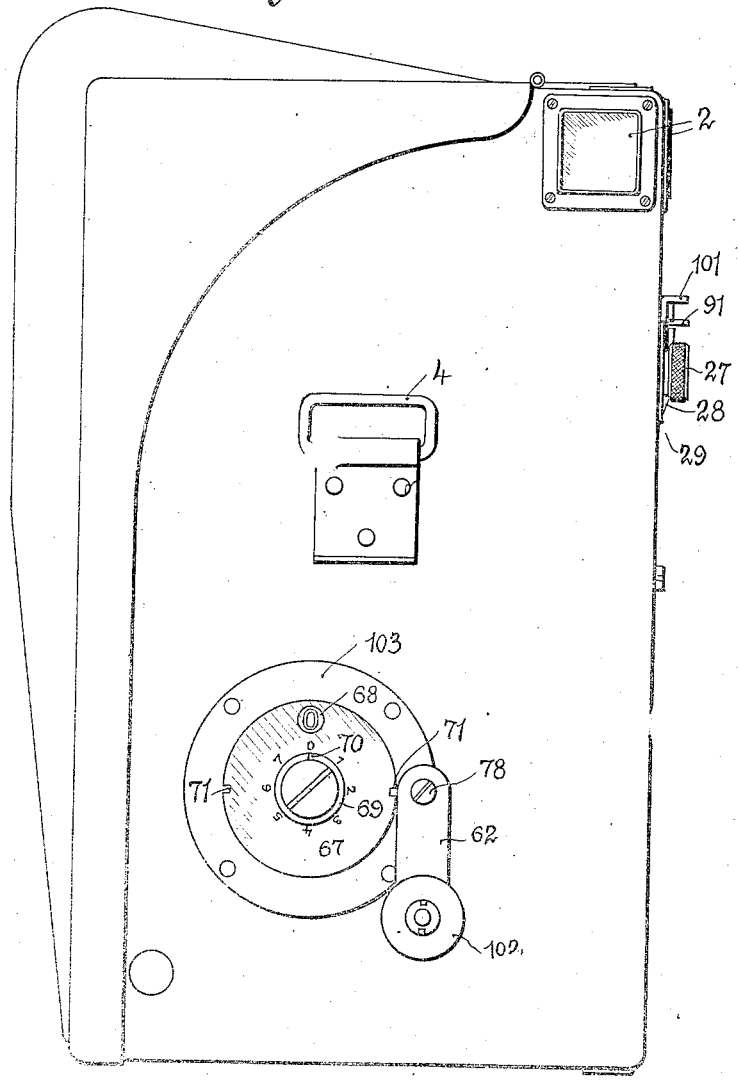
Figure 4:
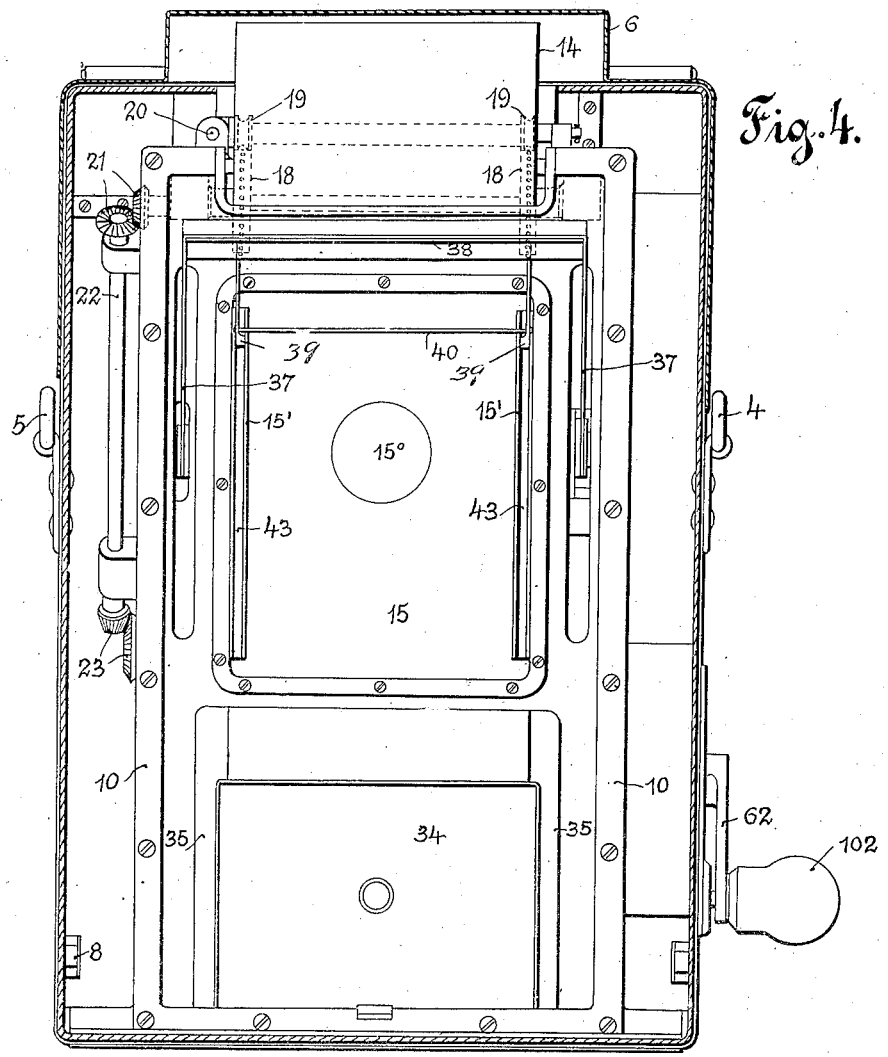
Figure 5:
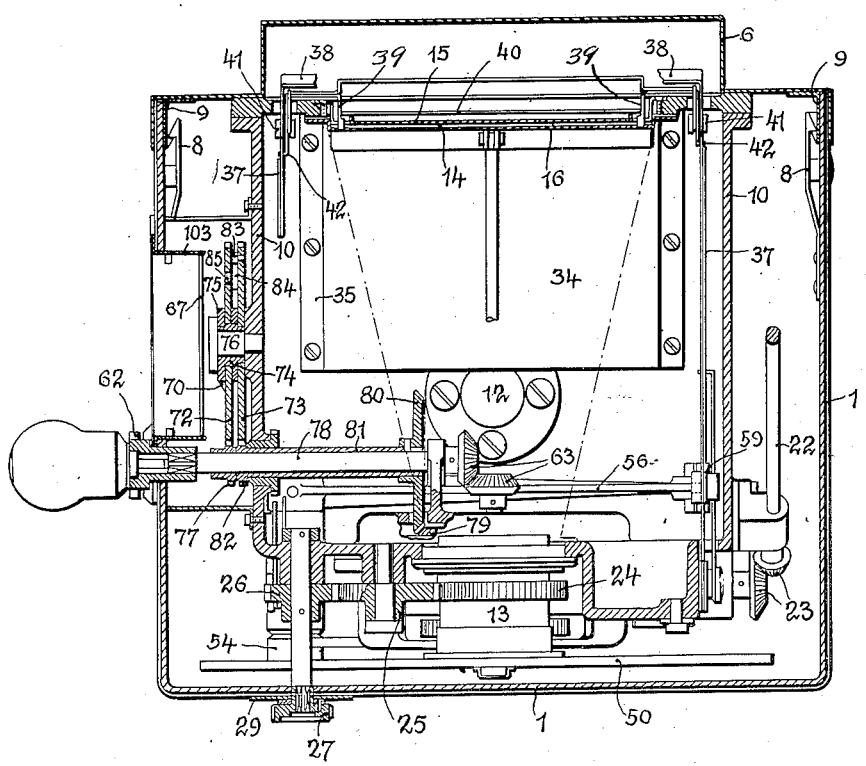
Figure 6:
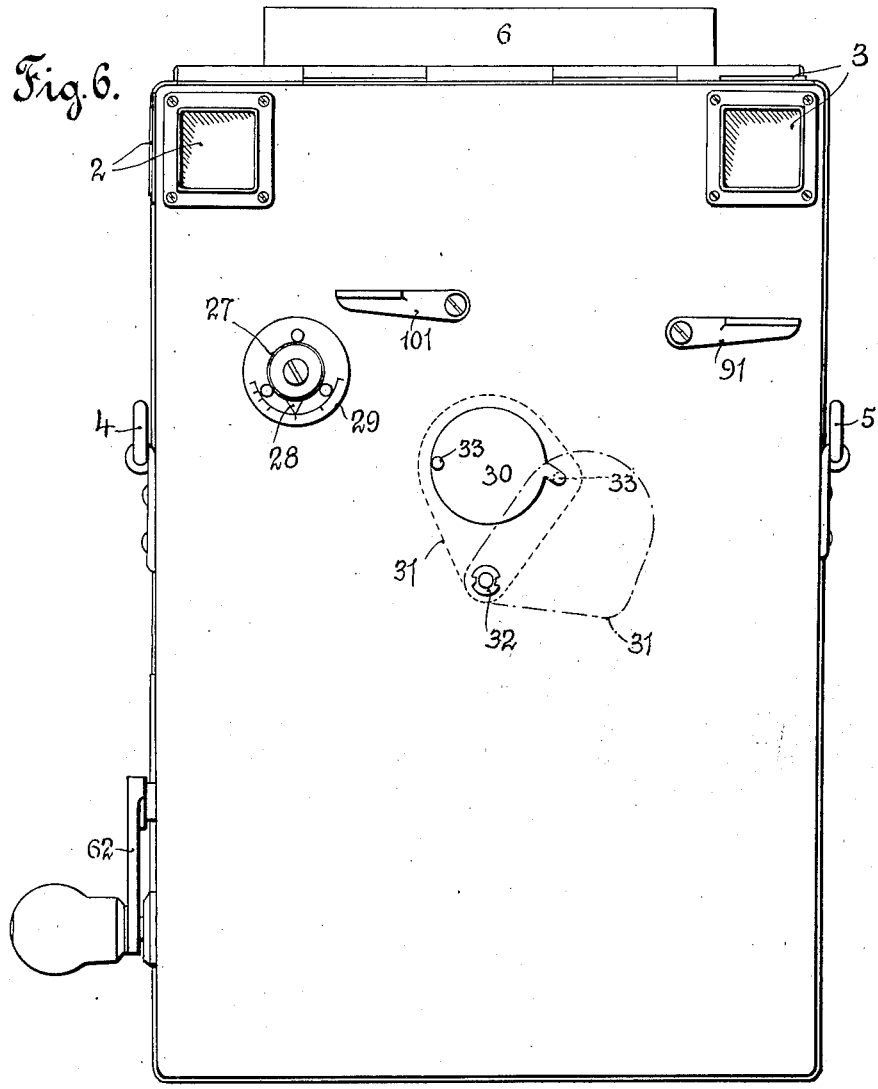

In the annexed drawings is shown by way of an example, the new photographic camera, in which Figure 1 illustrates a vertical longitudinal section and Fig. 2 a vertical cross section just behind the front wall. Fig. 3 is a side elevation. Fig. 4 is a vertical cross-section just behind the back wall of the camera and Fig. 5 is a horizontal section through various planes. Fig. 6 shows the camera from the front. Figs. 7–14 show several modifications of arrangements for moving the films.

In the illustrated examples the mechanism of the apparatus is arranged in a metal casing 1, which may be covered with leather. The front wall of the casing is fitted with two sights 2 and 3 and the side walls are provided with ears 4 and 5 for carrying straps. On the front wall of the casing two small oscillating arms 91 and 101 are also arranged, as well as a scale 29 with a pointer 28 and operating button 27; and the usual opening 30 situated opposite to the objective is also formed in said wall, which opening may be closed and opened by means of a disk 31 rotatably arranged on pin 32.

The back wall of the casing is formed by a metal cover 6 arranged on hinges 7 fixed to the upper wall of the casing. The cover is locked by means of the hooks 8 (Figs. 2, 4 and 5), and the side walls then fit in between the tightening lists 9 (Figs. 1, 2 and 5) and the bent corners of the cover, with the result that light is prevented from entering into the casing. As clearly shown in Fig. 1, the central portion of the hinged cover forms a box for the purpose of taking up the film.

The bottom of the casing is fixed to a metal frame 10 by means of the screws 11 (Fig. 1), and the various parts of the mechanism being arranged therein. The casing 1 and frame 10 as well as certain parts of the mechanism are preferably made from material as light in weight as possible for instance, aluminium. For the purpose of enabling the apparatus to be fixed to a tripod or other support, the bottom plate of frame 10 is provided with a central threaded hole 12.

The objective 13 is put in the frame 1 behind the opening 30 in the front wall of the box (Figs. 1 and 5). The objective throws the image on the light-sensitive film-ribbon 14, which is guided between the plate 15 arranged in the back-wall of the frame 10 and the shield 16 (Figs. 1, 4 and 5). The film is wound on a spool 17 (Fig. 1) and is unwound from this spool by means of a mechanism, working in a uniform manner. This mechanism consists of two driving rolls 18 and two small rolls 19, the rolls 19 being arranged on the same axle and tending to press the film-ribbon against the aforesaid rolls 18. The axle for the press-rolls may be raised, being pivoted to swing on the pin 20 (Figs. 2 and 4), whereby the introduction of the film-ribbon is facilitated. A spring 45, which is provided in a housing, serves as the driving means (Fig. 1). The axle for the rolls 18 may be driven by bevel gearing 21 (Figs. 2 and 4) from a shaft 22 which, in turn, is driven by bevel gearing 23 (Figs. 1, 2, 4 and 5) from the spring 45.

The outer toothed rim 24 on the Iris-blind of the objective (Figs. 2 and 5) is driven from the toothed wheel 26 through the intermediary of toothed wheel 25. The axle of the toothed wheel 26 projects through the front-wall of the casing and is provided with the previously mentioned button 27 (Figs. 1, 3, 4, 5 and 6), the associated hand or pointer 28 indicating on the scale 29 the position of the blind. The opening 30 may—as already mentioned—be closed by means of the disk 31 (Figs. 1 and 6), said disk having a pin 33 which serves for limiting the outer position of disk.

When the objective is uncovered the pin 33 is in the position shown in dotted lines. A box 34 is arranged in the lower corner of the casing 1. 35 are guiding lists for this box which is put in place in the casing from the rear part of the same; it is kept in position by means of the hooks 36 (Fig. 1). The exposed film is introduced into the box 34 through an opening in the upper wall of this box. If the film-ribbon is of the non-rolling type, a roll must be arranged in the box 34, which by means of an elastic cord or belt is driven from the axle of the feed-roll 18. The film-ribbon is—as already mentioned—drawn uniformly forward by means of the devices 18 and 19 and in such a way, that before the exposing of every three part-pictures a "bend" of film in a length corresponding to three photos is formed as shown on the drawing 1.

When the part negatives which are to be combined into a total-picture are taken, the film collected in the form of a "bend" above the objective is drawn step by step at a quick speed past the objective. This is effected by means of the following arrangement.

On both sides of the frame 10 arms 37 of steel, or the like are arranged. These arms are capable of turning on the pins or journals 44, and they are connected with each other by means of a cross-piece 38 and thus form a U-shaped frame. The ends of the arms 37 are provided with feeding pawls 39, pivoted on the journals 41 and connected together by means of a rod or cord 40, said pawls being pressed against the perforating line of the film ribbon by means of the springs 42. The pawls are arranged in vertical slots 43 (Fig. 4) in the guiding plate 15 for the film-ribbon, and the cord 40 which connects the pawls lies close to the outturned edges 15¹ of this plate thereby limiting the depth to which the pointed ends of the pawls may pass through the perforations of the film ribbon. When the oscillating frame 37, 38, 37, makes a downward movement, the pawls 39 move the film ribbon 14 quickly downward past the objective. If however, the frame 37, 38, 37 swings back into the original position, the pawls 39 slide upward along the ribbon. In the following downward motion they again move the ribbon in downward direction by one step or in other words the film is moved downward by one length of a picture.

The aforesaid arrangement for successively shifting the film step by step is also driven by the spring 45 which is inclosed in a drum 46 (Fig. 1). A toothed wheel 47 is fixed to this drum and is in mesh with toothed wheel 48 on the axle 49 on which an aluminium disk 50 is also fixed. This disk is provided with three segment-shaped cuts which are covered by suitable light-filters 51 (Figs. 1 and 2). The disk 50 is provided with an outer metal frame or rim, which has three elevated places or cams 52, spaced at the same distance from each other (Fig. 2). The disk has also an opening with a light-tight cover 53, giving access to the objective. The plate 15, over which the film-ribbon passes, is also provided with an opening 15° (Figs. 1 and 4), which enables the cleaning of the objective glass by means of a suitable brush. The roll 55, mounted on an oscillating arm 54, which is carried by the axle 57, presses against the cam rim 52 of the disk 50. The opposite end of the aforesaid axle is provided with another oscillating arm 56 (Figs. 1 and 5), which is connected with the arms 37 above referred to at its free end by means of the hinge 58, the steel ribbon 59 and the journal 60. The springs 61 tend to keep frame 37, 38, 37 in the highest position shown on Fig. 1, consequently pressing the roll 55 on arm 54 in an elastic manner against the rim of disk 50. As the disk 50, 52 is not circular a coöperation takes place between the cam parts 52 and the springs 61, with the result that an oscillating up-and-down motion of the frame 37, 38, 37 is effected. Fig. 2 shows the disk in a position in which the oscillating arms and the frame as well are brought into the same position viz. the lowest one. At this moment a complete displacement of the film ribbon by one length has taken place and the objective is opened by means of the disk 50. While at a standstill the ribbon is exposed through one of the three colored filters 51. The operating spring 45 is wound up by means of the crank-handle 62 (Figs. 2, 3, 4, 5, 6) fitted with a stopping-pin 64, as shown in Fig. 2. When the crank-handle is in a certain position after each complete rotation the spring 65 causes the aforesaid stopping-pin to enter the hole 66. By drawing back the button 102, the crank-handle 62 may be loosened. The spring 45 is wound up by turning the handle to the left and slackened by turning in the opposite direction. Each complete rotation of the crank-handle is equal to a complete rotation of disk 50 and consequently corresponds to three complete reciprocating movements of frame 37, 38, 37 or in other words a displacement of the film ribbon by three lengths, step by step, has taken place and three part-negatives have been taken through three different light-filters 51.

The more the spring is compressed, the quicker the disk 50 returns back under the influence of the spring and the quicker the three part negatives are taken. If for instance the length of film is equal to 8 groups of pictures (in the three-color system 8×3=24 views) the crank handle 62 must be turned 8 times around, when the spring is wound up. Eight operating speeds may then be used for the light-filters. If all the twenty-four part negatives are to be taken at a certain (one and the same) speed, the crank handle 62 must—after each complete rotation of disk 50 (and the taking of three sets of part negatives)—again be turned around one time, in order that the spring may get the tension it had at the start.

The operating speed chosen, in the construction shown, is indicated by a device (Fig. 3) which is arranged near the crank-handle and consists of a glass disk 67 in a member 103. A number indicates the speed chosen in each case. If the member number 6 for instance, appears at the opening 68, it means that the apparatus is adjusted for the sixth speed and that the number 5 will appear after the taking of a set of three pictures. By turning the crank-handle in one or the other direction any of the possible eight speeds may be chosen.

The indicating mechanism is constructed as follows: The glass-disk 67 is fitted with a scale 69 and behind this disk a rotary disk 75 (Fig. 5) is mounted on the pin 76 with hand 70, which during the operation turns over the scale 69 and is quite independent of the indicator 68. If the hand 70, does not point at "0" on the scale 69, the member 103 is turned by means of the pin 71 until the hand points at "0."

The speed indicating gear proper consists of two toothed wheels 72 and 73 (Figs. 2 and 5) of which 73 is fastened to the sleeve 74. To the latter, also disk 75 with the hand 70 is fixed. The sleeve 74 is loose on the pin 76 and wheel 72 is loose on sleeve 74. On the side of the wheel 73 which faces toward the glass disk 67 the numbers 0, 1, 2 ... 8 are marked, one of these being always visible through the previously mentioned opening 68 which is formed in the wheel 72. This wheel 72 meshes with pinion 77 on axle 78, which may be rotated by means of the crank-handle 62. The ratio of gearing between 77 and 72 is 1:8, so that the wheel 72 is turned ⅛ of a complete rotation when the crank handle is turned around one time with the result that the opening 68 in this wheel adjusts itself to the following number of the wheel 73. When photographs are taken the drum or housing 46 of spring 45 is turned in the same direction and consequently motion is transferred to the toothed wheel 73 in the same direction by means of the bevel wheel 79, meshing with toothed wheel 80 on the hollow axle 81, which carries the pinion 82 engaged with the toothed wheel 73. The ratio of gearing between 82 and 73 is also 1:8. From this it results that the wheel 73 catches up with the wheel 72, wit. 'the consequence that the preceding number re appears in the window 68. But as the wheel 73 at the same time is connected with disk 75, carrying the hand 70, it will shift the hand by one number or a point on the scale for each complete rotation of the drum i. e. after each completion of a picture-trio. In order to limit the number of complete rotations on the crank handle 62, the wheel 73 is provided with a pin or a finger 83, which after eight complete rotations of the crank 62 in the same direction hits the stop 84 on the wheel 72. The stop referred to cannot swivel on the journal 85.

While three sets of part-pictures are being taken the disk 50 makes a complete rotation, after which the disk is arrested by means of a pin 87, which is gripped by the hook on fork 86 (Fig. 2). The fork is rotatably arranged on the journal 87° and is pressed against one of the arms of another fork 89 by means of the spring 88. A shaft 90 for a small oscillating arm 91 is provided on the aforesaid fork-shaped member 89 (Figs. 1 and 6). A cylinder 92 for an air-compressor or air-dashpot is located tangent to the disk 50. The air-pump piston 94 is worked by the spring 96, and the cylinder may be rotated on the pin 93. The piston rod 95 is stepped in a special way as shown. The spring 96 tends to keep the piston 94, 95 at the end of the stroke. By means of a passage 97, which may be regulated by a screw, the rear part of the piston is connected with the outer air. The spring 98 presses the cylinder 92 against the oscillating arm 99. The latter is fixed to axle 100 which projects through the casing and carries the fixed oscillating arm 101 (Figs. 2 and 6). By pressing on the oscillating arm 101 the cylinder 92 may be moved somewhat away from the disk 50. Before the pictures are to be taken the piston rod is at the end of the stroke. If the disk 50 is released by pressing on the oscillating arm 91, or in other words, if the hook on fork 86 is turned away from the stop pin 87 on the disk 50, the disk performs a rotation in the direction shown by the arrow X and its stop or finger 87 hits at the end of a complete rotation the end of the piston rod 95 with the result that the rod is pressed into the cylinder against the spring 96. Then the air slowly escapes from the rear end of the cylinder through the small passage 97, which is so designed that the air compressed by the piston 94, does not cause any noticeable back-push of the piston. When the disk is at a stand-still, the cylinder is turned upward a little by pressing on the oscillating arm 101, with the result that the rod 95 releases the finger 87. This finger then places itself in the hook 86, while the piston-rod 95 is pressed downward in the cylinder by the spring 96 into its original position and is again ready for the next operation.

If both oscillating arms 91 and 101, were pressed downward at the same time, the disk would not stop after each complete rotation, but all the 8 picture-series would be taken after each other in quick succession. In order to prevent this, the cylinder 92 is provided with a projection in the shape of a hook 104, which when the cylinder is turned away, comes before the fork 89 and thus prevents the same from being turned. If on the other hand the oscillating arm 91 is pressed down, the same arm on fork 89 comes in a position over the projection 104 and makes it impossible to turn the cylinder upward, when the disk 50 is released or free.

Figure 7:
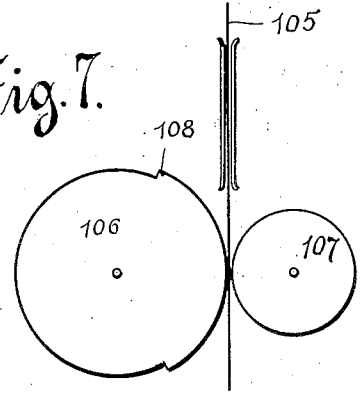
Figure 8:
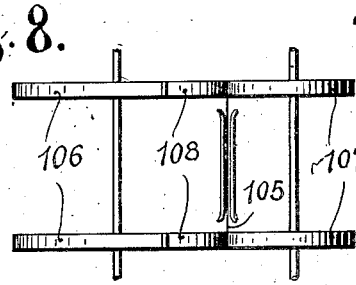

Figs. 7 and 8 diagrammatically illustrate a modified construction of the mechanism to move the film ribbon. In this arrangement the film ribbon 105 passes between two sets of disks 106 and 107 with cylindrical surfaces. The disks 106 are revoluble and are provided with projecting sections 108 with cylindrical surfaces, having a somewhat greater radius than the rest of the disk surface. The disks 107 press the film toward the disks 106 when these projecting sections 108 are directed against the disks 107 the film being hereby pulled forward.

Figure 9:
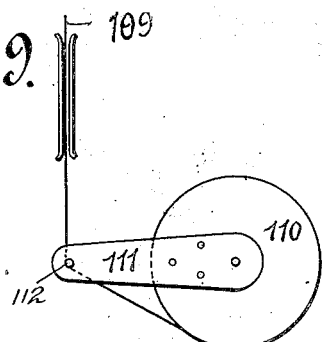
Figure 10:
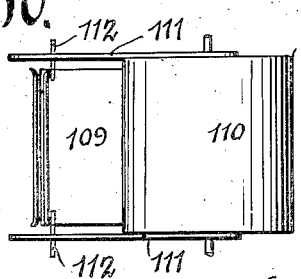

In Figs. 9 and 10 another moving mechanism is illustrated, which operates in the following manner:

The film 109 is wound up on a cylinder 110 provided at its ends with arms 111 carrying pins 112. These pins catch the film edges, when the cylinder 110 revolves and pull the film forward to the extent desired. The pins are pulled automatically back and release the film, where this latter has been moved a suitable distance forward, and is automatically returned into working position, when the film is to be moved a further step.

Figure 11:
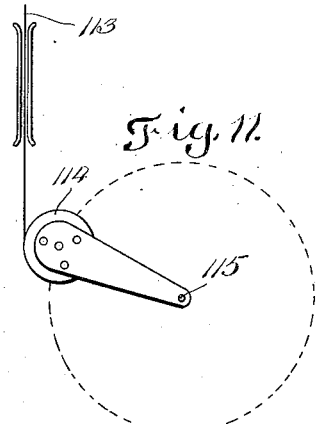
Figure 12:
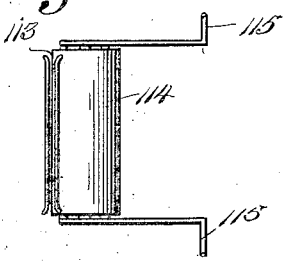

The arrangement illustrated in Figs. 11 and 12 operates in a similar manner. The film ribbon 113 is wound upon a cylinder 114 carried by a pair of arms which rotate about the pivots 115, so that the cylinder 114 is thus caused to revolve in a circular path whose center is constituted by the aforesaid pivots 115. The radius of this path being greater than the radius of the cylinder 114 the film ribbon during the revolution of the system will alternately be pulled forward or kept at a standstill.

Figure 13:
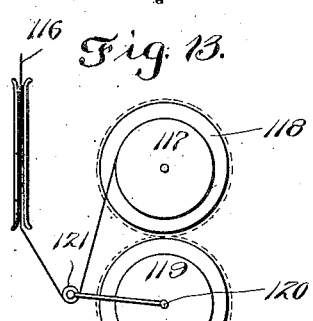
Figure 14:
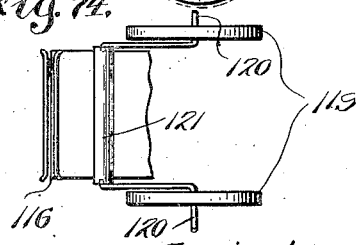

In the moving mechanism illustrated in Figs. 13 and 14 the film 116 is wound up on a cylinder 117, which by means of a toothed gearing 118, 119 causes the pivots 120 to rotate. With the pivots 120 is connected a crank cylinder 121 below which the film passes before it enters the cylinder 117. By these means the film will be pulled forward step by step and at the same time it will be wound up on the cylinder 117.

I claim as my invention:

1. A camera for color photography comprising an objective; a rotary disk arranged in front thereof and provided with a set of light filters; operating mechanism for said disk; and a film-feeding device embodying an oscillating frame operatively connected with the disk and provided with means engageable in the perforations in the film.

2. A camera for color photography comprising an objective; a rotary disk arranged in front thereof and provided with a set of light filters; operating mechanism for said disk; a cam rim on the disk having a plurality of rises, one for each filter; an oscillating arm associated with said cam rim to be operated thereby; a film-feeding device; and a connection between said feeding device and said arm for operating the former from the latter.

3. A camera for color photography comprising an objective; a rotary disk arranged in front thereof and provided with a set of light filters; operating mechanism for said disk; a cam rim on the disk having a plurality of rises, one for each filter; a pair of rocking arms connected to move in unison, one arm operatively engaging said cam rim; a film-feeding device; and a flexible band connection between the other arm and said feeding device to operate the latter.

4. A camera for color photography comprising an objective; a rotary filter disk in front thereof; driving mechanism for said disk; film-feeding mechanism including an oscillating frame having a pair of feeding pawls pivoted to it to engage the perforations in the film; a guide plate for the film; and a thread connecting said pawls and adapted to slide over said plate during the movements of the frame.

5. A camera for color photography comprising a rotary filter disk; driving mechanism therefor; a dash-pot; a projection on said disk engageable with the piston of the dash-pot; and a spring-actuated catch engageable with said projection.

6. A camera for color photography comprising a rotary filter disk; driving mechanism therefor; a pivotally-mounted dash-pot; a projection on said disk engageable with the piston of the dash-pot; a spring-actuated catch engageable with said projection; and a member connected to rock the dash-pot away from said disk to disengage said piston from said projection and thereby enable the engagement of the catch therewith.

7. A camera for color photography comprising a rotary filter disk; driving mechanism therefor; a pivotally-mounted dash-pot; a projection on said disk engageable with the piston of the dash-pot; a spring-actuated catch engageable with said projection; a member connected to rock the dash-pot away from said disk to disengage said piston from said projection and thereby enable the engagement of the catch therewith; a member connected to rock said catch out of such engagement; and means for locking either of said members against operation when the other member is operated.

8. A camera for color photography comprising a rotary filter disk; driving mechanism therefor; a pivotally-mounted dash-pot; a projection on said disk engageable with the piston of the dash-pot; a spring-actuated catch engageable with said projection; a member connected to rock the dash-pot away from said disk to disengage said piston from said projection and thereby enable the engagement of the catch therewith; a member connected to rock said catch out of such engagement; and a projection on the dash-pot engageable with the second-named member during the movement of said dash-pot to lock that member against operation, and engageable by said second-named member during the movement of the latter to hold the dash-pot and the first-named member against operation.

9. In a camera for color photography, the combination, with film-feeding mechanism including a spring-drum, of a handle for winding up the spring; an indicating device; and separate connections between said indicating device and said handle and drum.

In testimony that I claim the foregoing as my invention, I have signed my name in presence of two subscribing witnesses.

SERGE de PROCOUDINE-GORSKY.

Witnesses:
 MAGNUS BRIGGS,
 ELISE POULSTON.